United States Patent
Van Der Poel

(10) Patent No.: US 9,788,394 B2
(45) Date of Patent: Oct. 10, 2017

(54) LIGHTING SYSTEM, CONTROLLER AND LIGHTING METHOD

(71) Applicant: PHILIPS LIGHTING HOLDING B.V., Eindhoven (NL)

(72) Inventor: Lucas Leo Desire Van Der Poel, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/122,201

(22) PCT Filed: Feb. 13, 2015

(86) PCT No.: PCT/EP2015/053068
§ 371 (c)(1),
(2) Date: Aug. 29, 2016

(87) PCT Pub. No.: WO2015/128205
PCT Pub. Date: Sep. 3, 2015

(65) Prior Publication Data
US 2016/0374176 A1  Dec. 22, 2016

(30) Foreign Application Priority Data

Feb. 27, 2014 (EP) ..................................... 14157039

(51) Int. Cl.
*H05B 37/02* (2006.01)
*H05B 33/08* (2006.01)

(52) U.S. Cl.
CPC ..... *H05B 37/0218* (2013.01); *H05B 33/0854* (2013.01); *H05B 33/0872* (2013.01); *Y02B 20/46* (2013.01)

(58) Field of Classification Search
CPC ............ H05B 37/0218; H05B 33/0872; H05B 33/0854; Y02B 20/46
See application file for complete search history.

(56) References Cited

U.S. PATENT DOCUMENTS

| 4,631,675 A | 12/1986 | Jacobsen et al. |
| 5,081,569 A | 1/1992 | Quiogue et al. |
| 9,456,482 B1 * | 9/2016 | Pope .................. H05B 33/0854 |
| 2004/0105264 A1 | 6/2004 | Spero |
| 2007/0153524 A1 | 7/2007 | Lee |
| 2013/0106309 A1 * | 5/2013 | Yip .................... H05B 37/0218 315/297 |
| 2013/0278172 A1 | 10/2013 | Maxik et al. |
| 2013/0307419 A1 | 11/2013 | Simonian et al. |

(Continued)

FOREIGN PATENT DOCUMENTS

| CN | 101742779 A | 6/2010 |
| CN | 201661916 U | 12/2010 |

(Continued)

OTHER PUBLICATIONS

Lupton, Martin, "Grid Stifles Imagination," Luminous, International Lighting Magazine, Jun. 2008 (48 pages).

*Primary Examiner* — Don Le

(57) ABSTRACT

A lighting system has a first lighting unit for providing general lighting and a second lighting unit for providing directed lighting. The lighting units are controlled based on sensed light conditions, in order to maintain an intensity and/or color contrast between the general lighting and the directed lighting.

11 Claims, 7 Drawing Sheets

(56) References Cited

U.S. PATENT DOCUMENTS

| | | | |
|---|---|---|---|
| 2015/0130365 A1* | 5/2015 | Kim | H05B 37/0272 315/209 R |
| 2015/0289347 A1* | 10/2015 | Baaijens | H05B 37/0227 315/294 |
| 2016/0286616 A1* | 9/2016 | van de Ven | H05B 33/0842 |
| 2016/0366746 A1* | 12/2016 | van de Ven | F21V 29/74 |
| 2017/0150584 A1* | 5/2017 | Motley | H05B 37/0272 |

FOREIGN PATENT DOCUMENTS

| | | |
|---|---|---|
| CN | 103327672 A | 9/2013 |
| DE | 4112110 A1 | 10/1992 |
| DE | 69424374 T2 | 12/2000 |
| DE | 202012100632 U1 | 3/2012 |
| EP | 1610197 A2 | 12/2005 |
| WO | 9628956 A1 | 9/1996 |
| WO | 2010018498 A1 | 2/2010 |
| WO | 2012004696 A2 | 1/2012 |

\* cited by examiner

US 9,788,394 B2

LIGHTING SYSTEM, CONTROLLER AND LIGHTING METHOD

CROSS-REFERENCE TO PRIOR APPLICATIONS

This application is the U.S. National Phase application under 35 U.S.C. §371 of International Application No. PCT/EP2015/053068, filed on Feb. 13, 2015, which claims the benefit of European Patent Application No. 14157039.0, filed on Feb. 27, 2014. These applications are hereby incorporated by reference herein.

FIELD OF THE INVENTION

The invention relates to a lighting system having general lighting and directed (accented) lighting. The accented lighting may be task light for illuminating a work station in a home or office or it can be directed lighting for illuminating an object on display in applications such as retail outlets or museum spaces.

BACKGROUND OF THE INVENTION

The invention relates to lighting systems which enable control of the color temperature of the light output, and which also takes account of the daylight level.

There is a general desire to use more daylight lighting in indoor spaces this to save energy on artificial lighting and to provide more natural lighting scenes. This development is called day light harvesting. Shop owners for example are interested to allow more daylight into their sales spaces, for example to save energy and to establish a green image for their brand. The problem however is that day light is dynamic and changes. The color temperature changes over day due to the position of the sun (more blue in morning and more warm in the evening time) and also the light level will vary over the course of a day in relation to the time of the day, the season and the weather conditions outside. Shop owners want to control their lighting conditions.

As the light intensity and color characteristic of the sun change throughout the course of the day, it would be advantageous to keep a given relationship between the general lighting within the shop and the directed lighting to maintain, for example, a given CRI, or other desired lighting characteristic over a display area within the shop.

In many environments, such as offices, factories but also living rooms, light is formed by a combination of incident daylight and added artificial light. In many cases the daylight cannot be influenced, or only to a limited extent, by the user, for example by opening or closing a blind. This makes control of the artificial light all the more important.

It is therefore known to provide a lighting system which takes account of the daylight level, notably for the artificial lighting of office buildings. In known systems, a light sensor is provided for measuring the daylight level, and a control signal is derived from the daylight level. A control unit is then arranged to switch on the artificial light when the measured daylight level drops below a predetermined minimum or, conversely, to switch off the artificial light when the measured daylight level exceeds a predetermined maximum. It is known in particular that in office lighting systems the control unit adjusts the intensity of the artificial light mainly inversely proportionally to the level of the daylight.

The sensors can be installed on the most important planes in the space to be illuminated. In a supermarket for example they can be installed on racks in the corridors. In a hospital, the sensing can be for the horizontal level of the patient's bed. By measuring the lighting level it is possible to control the general lighting level by dimming or increasing the artificial general lighting, to maintain an overall minimal lighting level.

It has also been proposed to provide dimmable and at the same time tunable white lighting. For example WO 96/28956 discloses a system which enables the color point of (fluorescent) lighting to be controlled in dependence on the ambient light level.

This invention relates in particular to lighting systems which includes general lighting units and accent lighting (by which is meant a more directed and generally higher intensity lighting). A problem arises that as the general lighting is changed, for example in response to the ambient light conditions, the effectiveness of the accent lighting alters. This can reduce the benefit of the accented lighting, either to provide a brighter workspace or to illuminate objects on show.

SUMMARY OF THE INVENTION

The invention is defined by the claims.

According to a first aspect, there is provided a lighting system comprising:

A lighting system comprising:
  a first lighting unit (10) for providing general lighting to a first area;
  a second lighting unit (14) for providing directed lighting to a smaller second area within the first area;
  a sensor arrangement (16,18) for detecting a general light intensity and/or color characteristic; and
  a controller (20) for controlling the first and second lighting units in dependence on the sensor arrangement output,
  wherein the controller is adapted to apply a predetermined relationship between the general lighting in the first area and the directed lighting in the second area to maintain a light intensity contrast between the general lighting and the directed lighting when the general light intensity is sensed and/or to maintain a color difference between the general lighting and the directed lighting when the color characteristic is sensed.

The invention is based on the recognition that directed (accent) lighting can look inconsistent when the general lighting level is changed in response to daylight conditions. The directed lighting is thus controlled together with the general lighting to maintain a desired effect or appearance of the directed lighting.

The invention is of particular interest for lighting of spaces where both general atmosphere and localized presentation are important, such as shops, museums, restaurants, bars, hospitals, offices, education centers, etc.

The characteristics of light that may be detected by the sensor are intensity, color and color temperature.

In one set of examples, the sensor arrangement is for detecting a general lighting intensity, and the predetermined relationship is a ratio between the general lighting intensity and the intensity of the second lighting unit output. In this way, the directed lighting can be maintained at a brighter level than the general lighting. It can always be a fixed factor higher in brightness, or a more complicated relationship between the two brightness levels can be established. If directed lighting is for example used to place emphasis on a product, this emphasis can be maintained even as the general illumination level changes.

The ratio can be maintained while the intensity of the second lighting unit output does not exceed a maximum intensity. When this maximum intensity is reached it may be kept constant at this level or turned off because the general illumination is already so bright.

In another set of examples, the sensor arrangement is for detecting a general lighting color characteristic, and the predetermined relationship is a mapping between the general lighting color characteristic and a color characteristic of the second lighting unit output. In these examples, as the general lighting changes color (for example because there is a component derived from ambient daylight which changes color with the time of day, weather or season), a contrast in color can be maintained between the general lighting and the accent lighting. In the context of this application, the word mapping can be understood to follow the meaning as understood by those skilled in the art, that is to say; an operation that associates each element of a given set with one or more elements of a second set.

It can be further understood as a matching process wherein the points of a first set are matched against the points of another set.

The mapping can comprise mapping a high color temperature general lighting to a lower color temperature directed lighting output and mapping a low color temperature general lighting to a higher color temperature directed lighting output. In this way, the color temperatures of the two types of light (general and accent) are kept different to maintain a color contrast.

These two different approaches can of course be combined in a single system.

In this case, the system is for example able to create a controlled contrast in dynamic general lighting spaces by changing the maximum intensity of a secondary light source as well as creating a difference in color temperature to create a preferred lighting of specific areas within the general space. By creating a difference in light intensity between an object and the surroundings (intensity contrast) and also making a color contrast, the system is able to increase the attention given to a special area or object on display. By selecting different shades of white lighting for example (i.e. different color temperatures) more depth can be created in a particular space or to a particular presentation area.

In one example, the sensor arrangement can comprise a sensor for detecting the outdoor daylight intensity and/or color. A knowledge of how much natural light enters the first area can then be used to determine the required output from the first lighting unit. In turn, this enables the general lighting intensity and/or color in the first area to be derived. The desired output of the second lighting unit can then be derived.

In another example, the sensor arrangement can comprise a sensor for detecting the general light intensity and/or color in the first area. This sensor then measures the combined effect of any natural daylight which has entered the area and the first lighting unit. This enables a feedback control of the first lighting unit. The desired output of the second lighting unit can then be derived again from the general lighting in the first area.

Preferably, the sensor for measuring the general lighting is away from the output of the second lighting unit.

The second lighting unit can for example comprise:
a spot light for providing task light to a work area; or
lighting for illuminating objects on display.

These objects can be items for sale, or items being displayed such as art objects.

The first and second lighting units can each comprise LED arrangements with controllable intensity and color temperature.

Another aspect provides a lighting method comprising:
providing general lighting to a first area;
providing directed lighting to a smaller second area within the first area;
detecting the general light intensity and/or color characteristic; and
controlling the first and second lighting units in dependence on the detected general light intensity and/or color characteristic by applying a predetermined relationship between the general lighting in the first area and the directed lighting in the second area to maintain an intensity and/or color contrast between them.

Another aspect provides a controller for controlling a lighting system which comprises a first lighting unit for providing general lighting to a first area and a second lighting unit for providing directed lighting to a smaller second area within the first area,
the controller comprising an input for receiving a detected general light intensity and/or color characteristic, and the controller being adapted to control the first and second lighting units in dependence on the received detected general light intensity and/or color characteristic sensor arrangement output by applying a predetermined relationship between the general lighting in the first area and the directed lighting in the second area to maintain an intensity contrast and/or color difference between them.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting system having a first lighting unit for providing general lighting and a second lighting unit for providing directed lighting. The lighting units are controlled based on sensed light conditions, in order to maintain an intensity and/or color contrast between the general lighting and the directed lighting.

Figure 1:
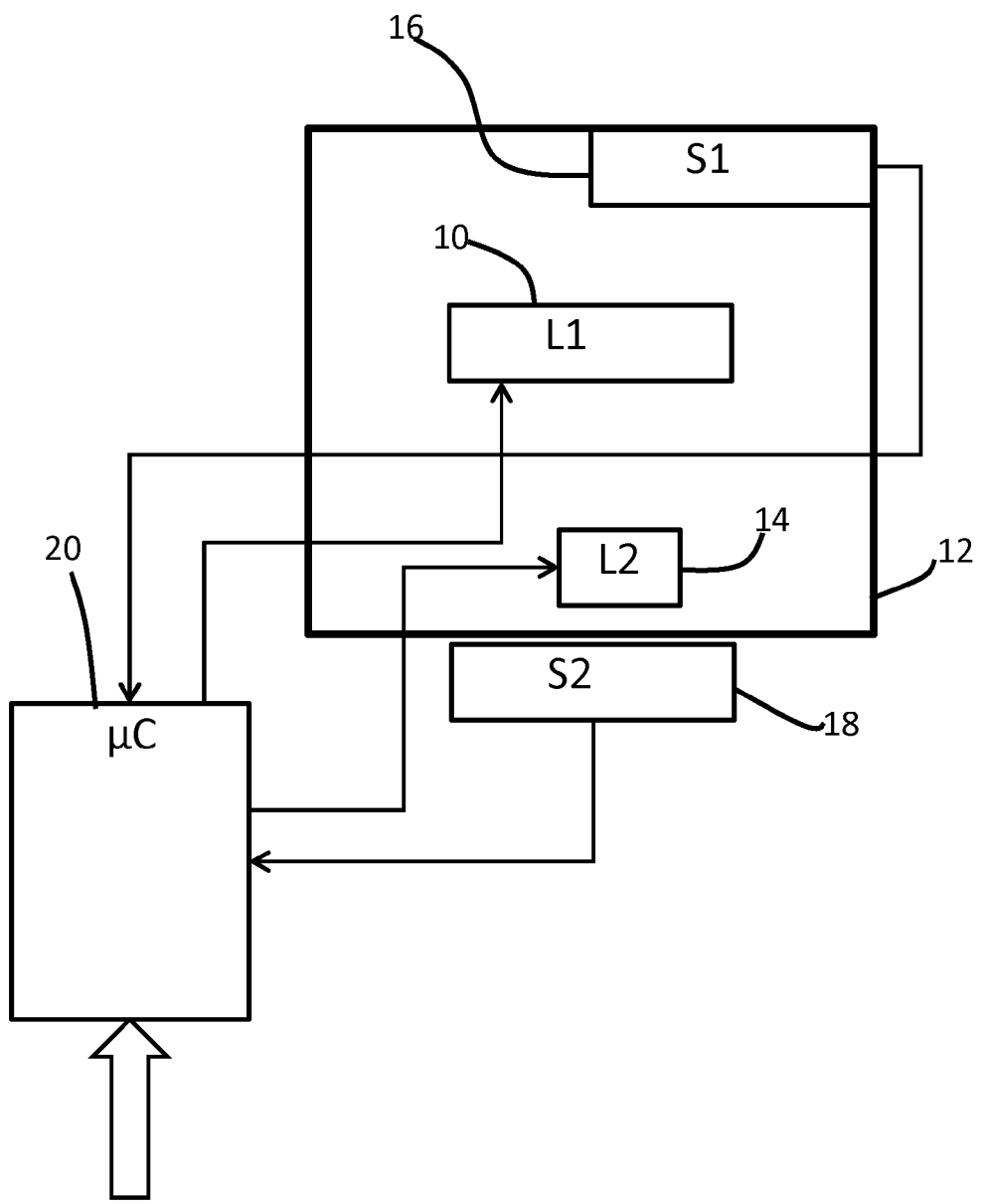
FIG. 1 shows a lighting system.

FIG. 1 shows a general block diagram of a lighting system in accordance with the invention.

The lighting system comprises at least a first light source 10 (L1) for providing general artificial illumination to an indoor space 12, and a second light source 14 (L2) for providing directed lighting.

The directed lighting is typically higher intensity light and it provides direct illumination to a smaller area than the general lighting of the first light source 10. The area illuminated by the second light source 14 is however also illuminated by the first light source.

The indoor space is also able to receive daylight, through a window, skylight or other opening.

At least the second light source 14 has an adjustable intensity and color temperature. The first light source has at least an adjustable intensity, and it may also have an adjustable color temperature.

A light source having an adjustable color temperature can be formed, for example by combining at least two dimmable light sources, each of which has a fixed, different color temperature. The light sources can be fluorescent lamps or LEDs or indeed any other type of lamps. The color temperature can be adjusted through a very wide range when a lamp having a fixed low color temperature for example of 2700 K is combined with a lamp having a high fixed color temperature for example of 6500 K. The color temperature can be adjusted by changing the flux ratio of the lamps, and this is possible with the total flux being maintained.

Of course adjustability through a smaller range, for example from 3500 K to 4000 K, can already suffice for many applications.

The concept is to control the light sources 10,14 to maintain the effectiveness of the directed lighting. This directed lighting is often referred to as accent lighting. The effectiveness of the accent lighting is influenced by the general lighting, and this in turn is influenced by the ambient daylight which enters the space.

To improve efficiency, it is known to provide dimming of the general artificial lighting from the first light source 10 in response to the intensity of the natural daylight. For this purpose a sensor arrangement is provided. FIG. 1 shows a first sensor 16 (S1) in the indoor space for sensing the general lighting level. This sensor will sense the combined lighting created by the first light source 10 and the ambient daylight. A second sensor 18 (S2) is shown outside indoor space for sensing the daylight level. This sensor will sense only the ambient daylight. It can instead be arranged inside the indoor space, facing a window for example so that its output is dominated by the ambient daylight. Ambient light sensors can be provided both inside and outside the indoor space if desired.

The orientation of the light sensors can be selected. For example, a sensor can be oriented in the horizontal plane to detect incident light from above, or in a vertical plane to detect horizontal incident light. The light sensing for detecting the general lighting level can combine multiple sensors in with different orientations to derive the desired measurement. The ambient light measurement will be selected so that it best represents the base lighting level as perceived by the user of the system when viewing the object for which there is accented lighting.

The system can thus be implemented with a single sensor or a combination of sensors, and each sensor can comprise a single sensing element or multiple sensing elements with different orientations.

As is discussed in more detail below, the control can be based on intensity control, or color temperature control or a combination of these. For intensity control only, the sensors may only need to detect intensity levels, whereas for color temperature control, color sensing is needed.

A controller 20 provides control of the first and second light sources 10,14, in particular to apply a predetermined relationship between the general lighting and the accent lighting to maintain an intensity and/or color contrast between them.

A first approach is to control the intensity of the second light source (the accent/task lighting) in dependence on the general illumination level in the space. For example the same accent factor can be maintained, where the accent factor is defined as the ratio of the intensity of the accent lighting to the intensity of the background lighting. With increasing daylight lighting levels, more daylight enters the indoor space, so the accent lighting intensity should then be increased to keep the same accent factor, which means a specific level of contrast is maintained.

In this case, the relationship which is maintained is a ratio between the general lighting intensity and the intensity of the second lighting unit output.

Figure 2:
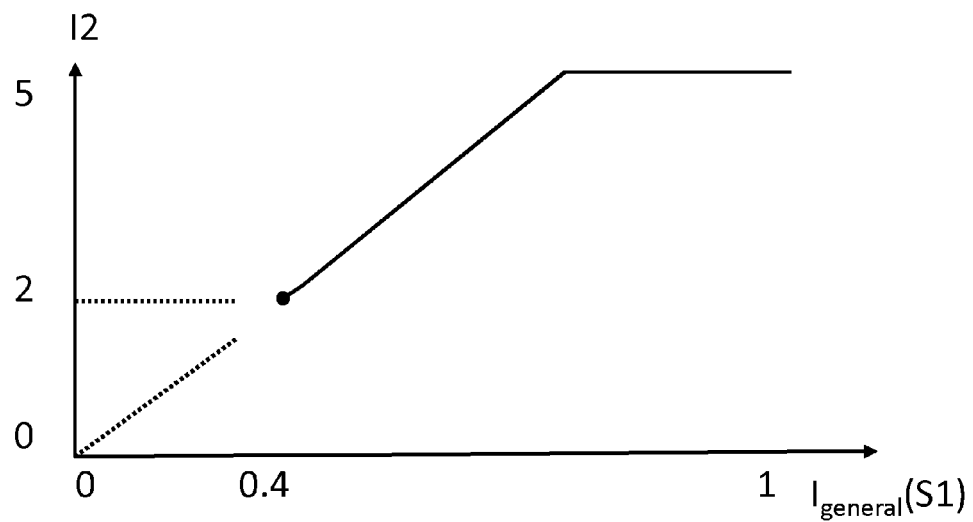
FIG. 2 shows a first possible relationship between general lighting intensity and directed light intensity.

FIG. 2 shows one possible relationship between the intensity of the general illumination as detected by the first sensor 16 and the intensity I2 of the directed light as provided under the control of the controller. The general illumination intensity is normalized to values between 0 and 1, and it represents the combined effect of the artificial light provided by the first light source 10 and the ambient light entering the indoor space. In this example, the general illumination level is maintained above 0.4. This is achieved by control of the first light source 10 in known manner. For this reason the graph starts at 0.4 on the x-axis.

The intensity I2 of the second light source 14 is shown to be adjustable between 0 and 5. The example shows a lowest level of 2 applied to give a desired contrast, and this increases as the intensity increases in a linear manner, to implement a ratio between the two intensities.

For example, during outdoor darkness or low outdoor light levels, the general illumination intensity may be kept to 0.4. This level increases if there is a significant amount of daylight entering. The ratio is maintained while the intensity of the second lighting unit output does not exceed a maximum intensity. Thus, when the second light source is at full output (shown as intensity 5), the intensity then becomes constant. The ratio between intensities is thus implemented for a range of driving conditions of the second light source. Within this driving range, the accent factor can be constant.

When the general illumination is so bright, there can situations when there is so much daylight entering the indoor space that the accent lighting will not be powerful enough to realize a noticeable contrast. In this case the accent lighting can be automatically switched off to save energy.

Figure 3:
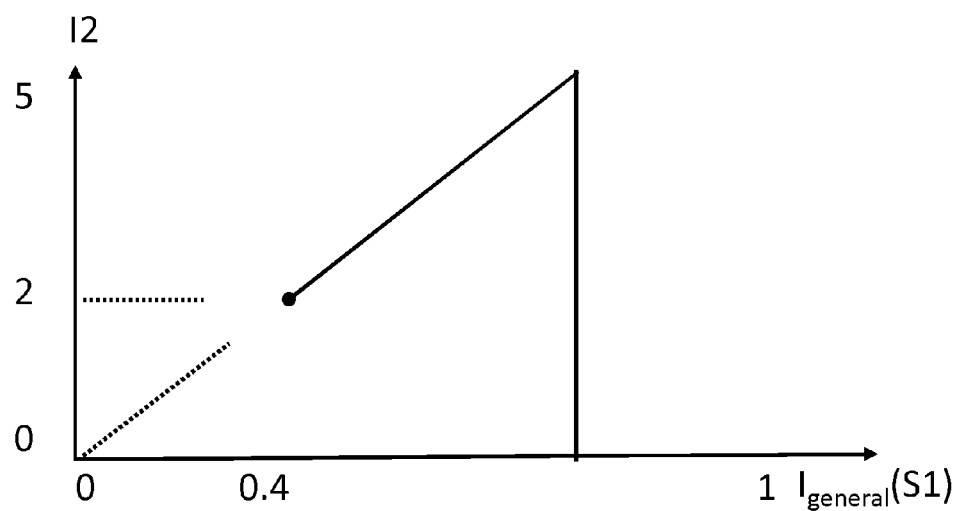
FIG. 3 shows a second possible relationship between general lighting intensity and directed light intensity.

This approach is shown in FIG. 3.

The intensity of the first light source 10 is controlled to reduce the intensity when the daylight can provide a contribution to the general illumination. This is a known automatic dimming solution, and for completeness an example of the implemented control is shown in FIG. 4.

Figure 4:
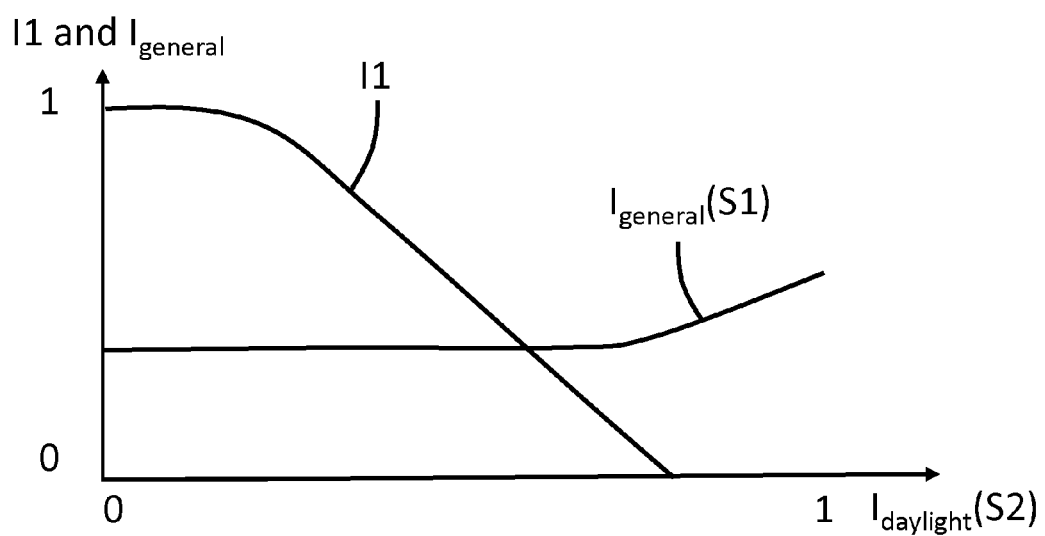
FIG. 4 shows a possible relationship between daylight intensity and artificial general lighting intensity and also overall general lighting intensity.

FIG. 4 shows how the general lighting intensity I1 provided by first light source 10 varies as a function of the daylight intensity level as detected by the sensor 18 (S2). For low daylight levels, the first light source 10 provides the illumination, but the intensity I1 can be dropped when the daylight provides a contribution. This means the overall general intensity as detected by sensor 16 (S1) remains constant, until the first light source is turned off. After this, the internal illumination intensity is a function of the daylight level.

A second approach is to control the color temperature intensity of the second light source (the accent lighting) in dependence on the color temperature in the interior space. For this purpose, a sensor can measure the color temperature of the daylight entering the space, or a sensor can measure the color temperature in the space, or both.

When the daylight is cool (for example above 6000K) so that the color temperature in the indoor space is higher, it is possible to adjust the color temperature of the accent lighting with tunable white light LED spots giving warmer white light (for example 3000K). This provides a color contrast.

This can be used to give a more friendly ambiance, such as an impression of sunlight entering the space and illuminating the object or workspace which is targeted by the second light source 14. By providing a color difference with the general lighting in the space a color contrast will be made at the area illuminated by the second light source, such as warm spot lighting on a cool illuminated background. The color contrast can create extra attention value which is important for example in retail environments.

The opposite scenario is also possible, when there is warm lighting entering the space it is possible to create accent lighting with cool regions again creating a color contrast. This color contrast automatically leads to increased visual attention.

Figure 5:
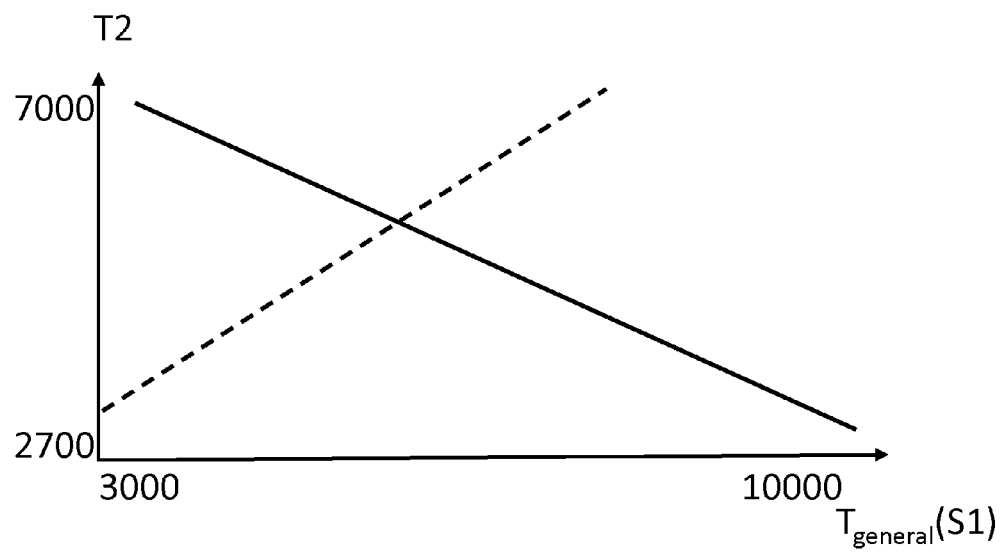
FIG. 5 shows a first possible relationship between general lighting color temperature intensity and directed light color temperature.

FIG. 5 shows a possible relationship between the color temperature T2 output by the second light source and the color temperature of general lighting (Tgeneral) as detected by sensor 16 (S1). There is an inverse relationship as shown to create the contrast explained above.

Figure 6:
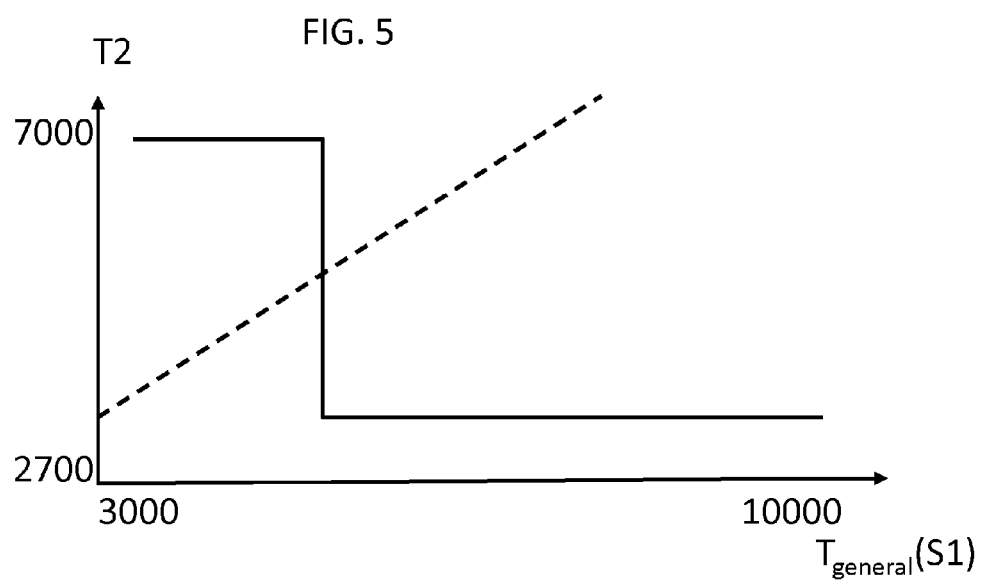
FIG. 6 shows a second possible relationship between general lighting color temperature intensity and directed light color temperature.

A problem with this relationship is that there is a crossing point where the two color temperatures are equal. FIG. 6 shows an approach in which the second light source only has two color temperature settings—the high color temperature setting is used for low temperature general lighting, and the low color temperature setting is used for high temperature general lighting.

Figure 7:
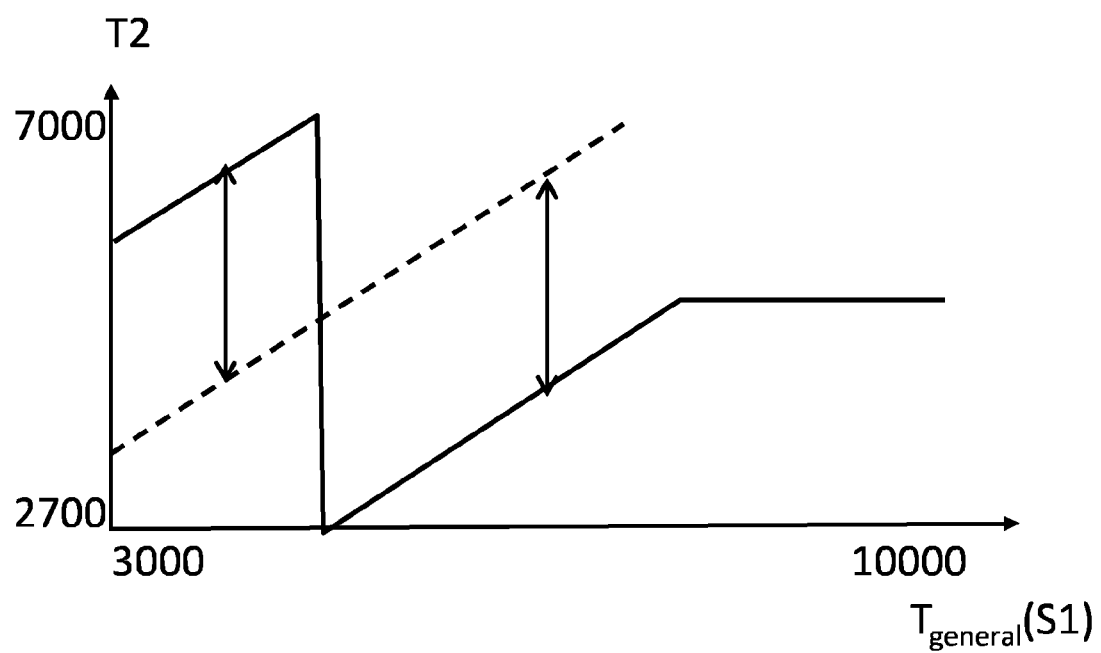
FIG. 7 shows a third possible relationship between general lighting color temperature intensity and directed light color temperature.

FIG. 7 shows a third approach in which a minimum difference in color temperature is maintained (as shown by the arrows). Thus, the color temperature provided by the second light source ramps linearly with the color temperature of the general lighting until a maximum is reached, at which point it switches to the lowest color temperature setting. To avoid instability at the switching point, hysteresis can be built into the algorithm, so that the color temperature T2 remains stable until there has been a sufficient change in the general lighting temperature T1.

The general lighting color temperature can be measured by the internal sensor 16. However, it can also be derived from the measured daylight sensor 18 by taking into account the known additional lighting provided by the first light source 10. Thus, in the same way as the intensity control approach, the color temperature control approach can be implemented with a single sensor, and multiple sensors as shown in FIG. 1 are not essential.

The two approaches above can be combined, so that there is intensity and color temperature control of the directed lighting.

FIGS. 8 to 11 show a possible use of the system. The indoor space is for example a supermarket with shelves 30 having dedicated lighting 32, which corresponds to the second light source described above. The main lighting is shown as light source 34. Natural daylight can enter the room through the roof window 36.

Figure 8:
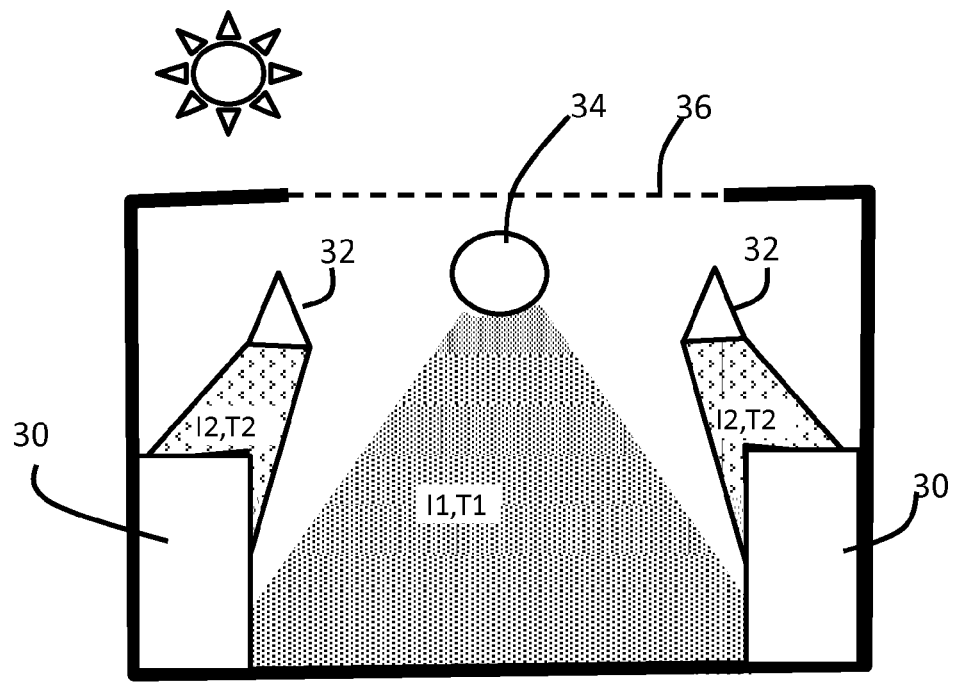
FIGS. 8 to 11 show different lighting provided at different times for one example of use of the system.

In FIG. 8, the sun has just risen on a clear day, and thus has a warm light color (low color temperature) and high intensity. The general lighting has intensity I1 and color temperature T1. This can be low intensity lighting (so that the color temperature of the ambient light dominates the color temperature of the general lighting in the room). The extra directed lighting has a higher intensity I2 and/or a different color temperature T2, such as cool (high color temperature) lighting. This provided both intensity and color contrast, although only one of these may suffice.

Figure 9:
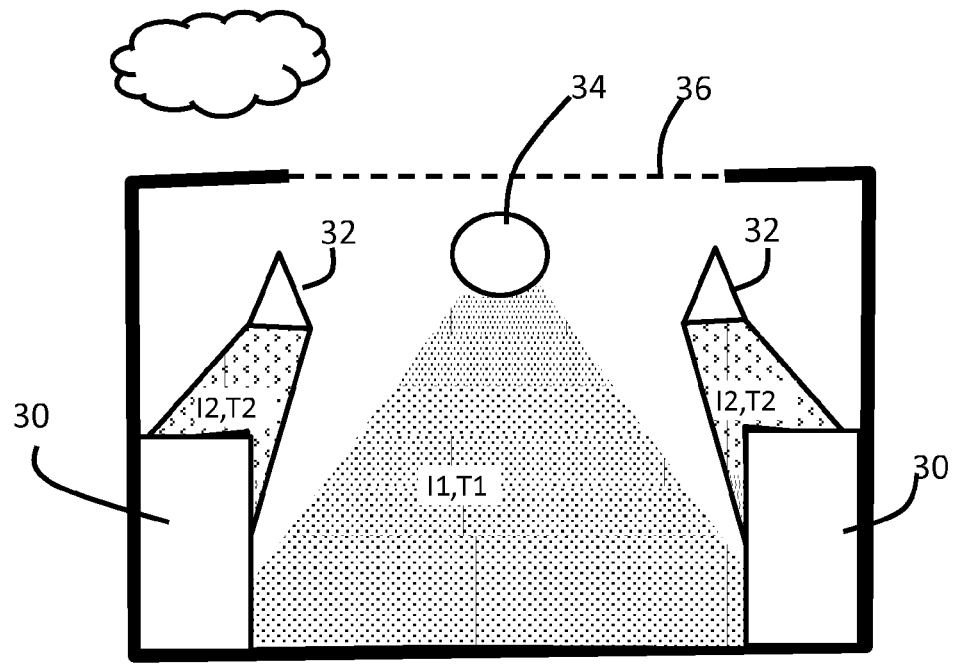

In FIG. 9, a cloudy day is shown, and thus there is lower intensity cooler outdoor light. The general lighting needs a higher intensity I1 and again has a color temperature T1. Because the general lighting is predominantly artificial, there is more possibility to control the color temperature prevailing in the space. The directed lighting has a higher intensity I2 and/or a different color temperature T2 to the prevailing general lighting.

Figure 10:
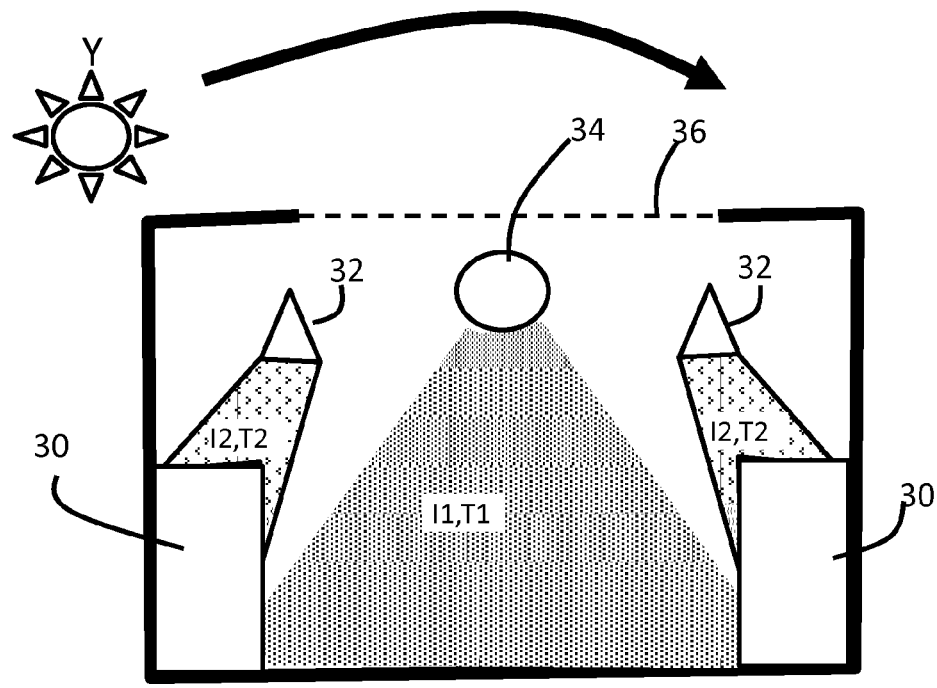
Figure 11:
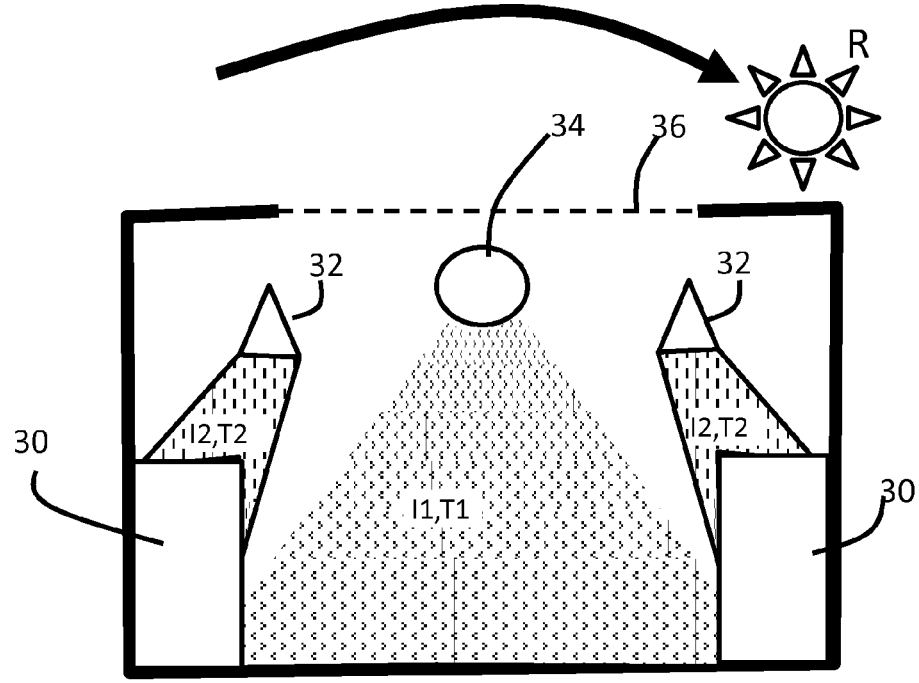

FIGS. 10 and 11 show that the lighting control can change during the course of the day. FIG. 10 corresponds to FIG. 8 with a yellow sun at the start of the day, and FIG. 11 shows the end of the same day. The ambient light becomes redder and has a different intensity at sunset so the settings I1, T and I2, T2 are adapted over the course of the day.

As mentioned above, it is known to alter the general artificial illumination in response to the daylight intensity level, including the color temperature. One novel approach is to add warmer artificial general lighting when there are low outdoor lighting levels and with higher outdoor lighting levels the lighting can be cooler. Low lighting levels with cool light are not preferred since they can create scenes which remind people of a misty or rainy day. At the same time high general lighting levels with warm light are not preferred since they will give the visitor the feeling that the room temperature is higher than in reality which will result in demands for extra air-conditioning.

The system described enables preferred lighting scenes to be defined in relation to the various possible daylight circumstances. The desired relationships can be provided as pre-set parameter combinations in a database. In this way, it is possible to obtain the right general and accent lighting setting to be combined with the prevailing daylight situation. The database can be tailored to the wishes of the user of the space. Each individual user can set a preferred balance between the color temperature of the general lighting and the accent lighting. The database with preferred settings can be used in various locations. For example this can ensure that the image of a shop chain will be the same in each individual shop. This is especially important for shop chains which want to give the same national or worldwide image.

Known light sensors can be used, such as photosensitive resistors and photosensitive diodes are known examples of light sensors.

The functions given above are only examples. More complicated relationships between the various parameters may be established without departing from the general aim of providing visible contrast between general and accent lighting. Instead of continuous functions as shown, discrete sets of parameter combinations can be pre-stored and one of these sets can be chosen in response to the sensed lighting conditions.

The controller for implementing the desired control can be implemented in numerous ways, with software and/or hardware, to perform the various functions required. A processor is only one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM, for example to store a database which implements desired functional mappings. The storage media may be encoded with one or more programs that, when executed on one or more processors and/or controllers, perform at the required functions.

Various storage media may be fixed within a processor or controller or may be transportable, such that the one or more programs stored thereon can be loaded into a processor or controller.

Various examples of possible application of the system are given above, as well as examples of the possible relationships between the light intensities and color temperatures. Different applications will have different requirements for these relationships.

For example, in museums there may be a maximum allowed illumination level, to prevent damaging artifacts on display. Thus, in a museum both the general and the accent lighting levels should be limited. This could mean that above a certain ambient lighting level all artificial lighting (general and accent) should be switched off. Especially in museums it can also be of interest to add warm accent lighting to cooler diffuse general lighting to create extra depth in presentations.

A system can of course have many different accent lighting units for different areas.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting system comprising:
a first lighting unit for providing general lighting to a first area;
a second lighting unit for providing directed lighting to a smaller second area within the first area;
a sensor arrangement for detecting an outdoor daylight intensity and/or color characteristic; and
a controller for controlling the first and second lighting units in dependence on the sensor arrangement output, wherein the controller is adapted to apply a predetermined relationship between the general lighting in the first area and the directed lighting in the second area to maintain a light intensity contrast between the general lighting and the directed lighting when the outdoor daylight intensity is sensed and/or to maintain a color difference between the general lighting and the directed lighting when the outdoor daylight color characteristic is sensed.

2. A system as claimed in claim 1, wherein the sensor arrangement is for detecting an outdoor daylight intensity and/or a color characteristic, and the predetermined relationship is a ratio between a general lighting intensity and the intensity of the second lighting unit output and/or a mapping between the general lighting color characteristic and a color characteristic of the second lighting unit output.

3. A system as claimed in claim 2, wherein the controller is adapted to maintain the ratio and/or mapping between the general lighting intensity and/or general lighting color characteristic and the intensity and/or color characteristic of the second lighting unit output while ensuring the intensity and/or color characteristic of the second lighting unit output does not exceed a maximum intensity and/or color characteristic.

4. A system as claimed in claim 1, wherein the mapping comprises mapping a high color temperature general lighting to a lower color temperature directed lighting output and mapping a low color temperature general lighting to a higher color temperature directed lighting output and/or wherein the ratio is maintained until the maximum intensity of the second lighting unit output is reached and then the second lighting unit is turned off.

5. A system as claimed in claim 1, wherein the sensor arrangement further comprises;
a second sensor for detecting the general lighting intensity and/or color in the first area.

6. A lighting system as claimed in claim 1, wherein the first and second lighting units each comprise LED arrangements with controllable intensity and color temperature.

7. A lighting method comprising:
providing general lighting to a first area via a first lighting unit;
providing directed lighting via a second lighting unit to a smaller second area within the first area;
detecting an outdoor daylight intensity and/or color characteristic; and
controlling the first and second lighting units in dependence on the sensor arrangement output by applying a predetermined relationship between the general lighting in the first area and the directed lighting in the second area to maintain an intensity contrast between the general lighting and the directed lighting when the outdoor daylight intensity is sensed and/or to maintain a color contrast between the general lighting and the directed lighting when the outdoor daylight color characteristic is sensed.

8. A method as claimed in claim 7, comprising detecting an outdoor daylight intensity and/or an outdoor daylight color characteristic, and controlling the first lighting unit and the second lighting unit such that a ratio between the general lighting intensity and the directed lighting intensity and/or a mapping between the general lighting color characteristic and the color characteristic of the second lighting unit output is maintained while ensuring the directed lighting intensity and/or color characteristic does not exceed a maximum intensity and/or color characteristic.

9. A method as claimed in claim 7, wherein providing a mapping comprises mapping a high color temperature general lighting to a lower color temperature directed lighting output and mapping a low color temperature general lighting to a higher color temperature directed lighting output.

10. A method as claimed in claim 7, wherein the detecting further comprises:
detecting the general light intensity and/or color in the first area.

11. A controller for controlling a lighting system according to claim 1, which comprises a first lighting unit for providing general lighting to a first area and a second lighting unit for providing directed lighting to a smaller second area within the first area, the controller comprising an input for receiving a detected general light intensity and/or color characteristic, and the controller being adapted to control the first and second lighting units in dependence on the received detected outdoor daylight intensity and/or outdoor daylight color characteristic sensor arrangement output by applying a predetermined relationship between the general lighting in the first area and the directed lighting in the second area to maintain an intensity contrast between the general lighting and the directed lighting when the general light intensity is sensed and/or to maintain a color difference between the general lighting and the directed lighting when the color characteristic is sensed.

* * * * *